United States Patent
Hwang

(10) Patent No.: US 6,469,905 B1
(45) Date of Patent: Oct. 22, 2002

(54) GUIDE RAIL DEVICE FOR RECEIVING A GBIC MODULE

(75) Inventor: Jenq-Yih Hwang, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/935,431

(22) Filed: Aug. 22, 2001

(51) Int. Cl.[7] .............................. H05K 5/04; H05K 1/14; H05K 7/14; H01R 13/42; H01R 13/648

(52) U.S. Cl. ...................... 361/756; 361/741; 361/760; 361/802; 361/818; 439/541.5; 439/607; 439/564; 439/573

(58) Field of Search ................................ 361/741–742, 361/756, 758–759, 770, 802, 760, 752, 818, 816; 439/564, 570, 573, 219, 607, 541.5

(56) References Cited

U.S. PATENT DOCUMENTS

| | | | | |
|---|---|---|---|---|
| 5,967,845 A | * | 10/1999 | Ho et al. ................... | 439/607 |
| RE36,820 E | * | 8/2000 | McGinley et al. .......... | 361/752 |
| 6,095,862 A | * | 8/2000 | Doye et al. ................. | 439/607 |
| 6,276,963 B1 | * | 8/2001 | Avery et al. ............. | 439/541.5 |
| 6,351,394 B1 | * | 2/2002 | Cunningham ............... | 361/818 |
| 6,368,122 B2 | * | 4/2002 | Billman ...................... | 439/138 |
| 2001/0039143 A1 | * | 11/2001 | Ikeda .......................... | 439/573 |

\* cited by examiner

Primary Examiner—Dameon E. Levi
(74) Attorney, Agent, or Firm—Wei Te Chung

(57) ABSTRACT

A guide rail (1) for receiving a GBIC module therein mounts to a printed circuit board (2) and includes a frame (10) having a receiving space (26) for receiving the GBIC module therein, a metallic cover (12), and a connector assembly (14) and two pairs of supporting poles (15) fastened to the frame for elevating the frame a given distance above the printed circuit board. The frame includes four side lugs (28) at outer walls thereof for attachment to selected ends of the respective supporting poles by four bolts (78). The lower ends of the supporting poles are mounted onto the printed circuit board. The connector assembly has a second connector (104) downwardly extending beyond a bottom surface (124) of the frame and mounted onto the printed circuit board, helping elevate the frame a given distance above the printed circuit board.

20 Claims, 9 Drawing Sheets

GUIDE RAIL DEVICE FOR RECEIVING A GBIC MODULE

BACKGROUND OF THE INVENTION

1. Field of the Invention

The present invention relates to a guide rail device for receiving a GBIC module therein.

2. Description of the Related Art

U.S. Pat. No. 5,879,173, issued to Poplawski et, al. on Mar. 9, 1999, discloses a receptacle or guide rail for receiving a removeable optoelectronic module therein. FIGS. 10, 15, and 16 of Poplawski disclose a guide rail 372 having a box configuration, while FIGS. 14, 17 and 18 disclose another type of guide rail. U.S. Pat. No. 5,767,999, issued to Kayner on Jun. 16, 1998, discloses another type of guide rail for receiving a removeable optoelectronic module therein. Both Poplawski et, al. and Kayner disclose an electrical connector adapted for electrically engaging with a GBIC module received in the guide rail. The electrical connector is mounted on a printed circuit board by solders and does not engage with the guide rail, so is not supported by the guide rail. Therefore, when the GBIC module mates with the electrical connector, the mounting tails of the contacts of the electrical connector are subjected to a force by the GBIC module which may destroy the connection between the mounting tails and the mounting pads on the printed circuit board.

U.S. Pat. No. 6,047,172, issued to Babineau et al. on Apr. 4, 2000, suggests an arrangement of guide rails in two rows, as shown in FIG. 2 of Babineau. (Note that only one layer is clearly illustrated.) The upper guide rails would be mounted on an upper printed circuit board, while the lower guide rails would be mounted on a lower printed circuit board. Although Babineau et al. suggests the idea of arranging the guide rails in two different levels, the implementation of this idea is not cost effective because two different printed circuit boards are required.

Hence, an improved stand-off guide rail for receiving a GBIC module is required.

SUMMARY OF THE INVENTION

A first object of the present invention is to provide a guide rail elevated a given distance above a printed circuit board and a connector/connector assembly securely fixed to the guide rail; and A second object of the present invention is to provide a guide rail elevated a given distance above a printed circuit board by supporting poles fastened to the printed circuit board.

To obtain the above objects, a guide rail for receiving a GBIC module therein comprises a frame defining a receiving space for receiving the GBIC module therein, a connector assembly fixed to the frame, and two pairs of supporting poles fastened to the frame by four bolts for elevating the frame a given distance above a printed circuit board. The frame includes four side lugs at outer walls thereof for attaching to selected ends of the respective supporting poles by the four bolts. Lower ends of the supporting poles are mounted onto the printed circuit board. The connector assembly has an extension downwardly extending beyond a bottom surface of the frame and mountable to the printed circuit board, also helping to elevate the frame a given distance above the printed circuit board.

The connector assembly includes a printed substrate, a first connector and a second connector mounted onto upper and lower surfaces of the printed circuit board. The first connector has two partitioning ribs on two opposite ends thereof and the frame defines two receiving slots in inner walls of side beams thereof which engageably receive the respective partitioning ribs therein, thereby securing the first connector to the frame.

The guide rail device further includes a metallic cover attached to the frame for providing EMI shielding to the GBIC module. The metallic cover has a hook downwardly extending from an end thereof and the first connector has an ear portion at a top thereof. The hook engageably attaches to the ear portion of the frame to provide a further retention of the first connector to the frame.

Other objects, advantages and novel features of the invention will become more apparent from the following detailed description of the present embodiment when taken in conjunction with the accompanying drawings.

BRIEF DESCRIPTION OF THE DRAWINGS

FIG. 1 is a partially exploded view of a guide rail of the present invention for receiving a GBIC module and a printed circuit board that the guide rail mounts on;

DESCRIPTION OF THE PREFERRED EMBODIMENT

Figure 1:
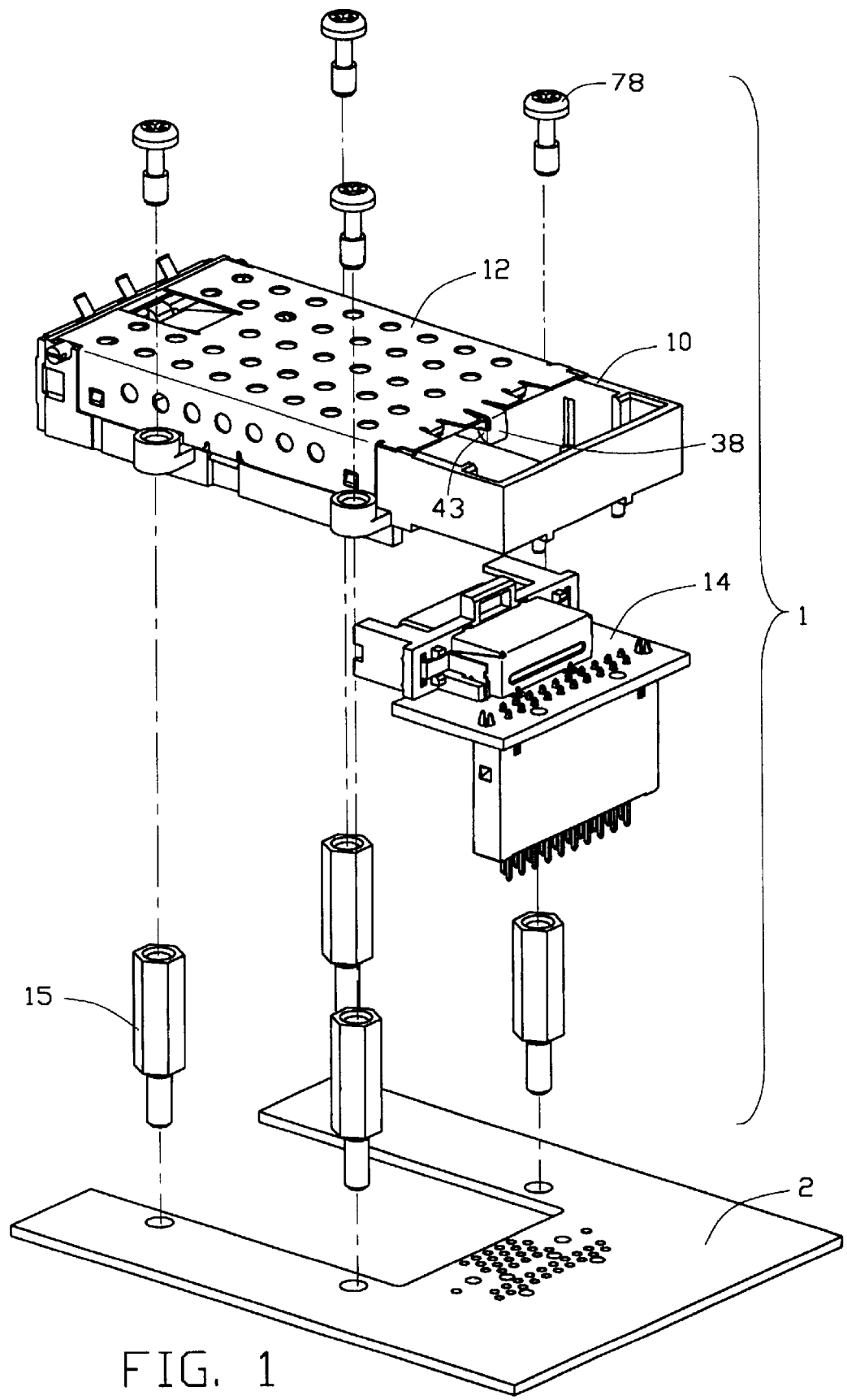

Referring to FIG. 1, the present invention relates to a guide rail 1 mountable onto a printed circuit board 2 (PCB) and adapted for receiving a giga-bit interface convertor (GBIC) module (not shown) therein and electrically connecting the GBIC module to the PCB 2. The guide rail 1 comprises a frame 10, generally made of metallic material, a metallic cover 12 attached to a top of the frame 10, an electrical connector assembly 14 engageably fixed to the frame 10, and four supporting poles 15 with fasteners 78 attached to the frame and the PCB 2 for elevating the frame 10 a predefined distance above the PCB 2.

Figure 2:
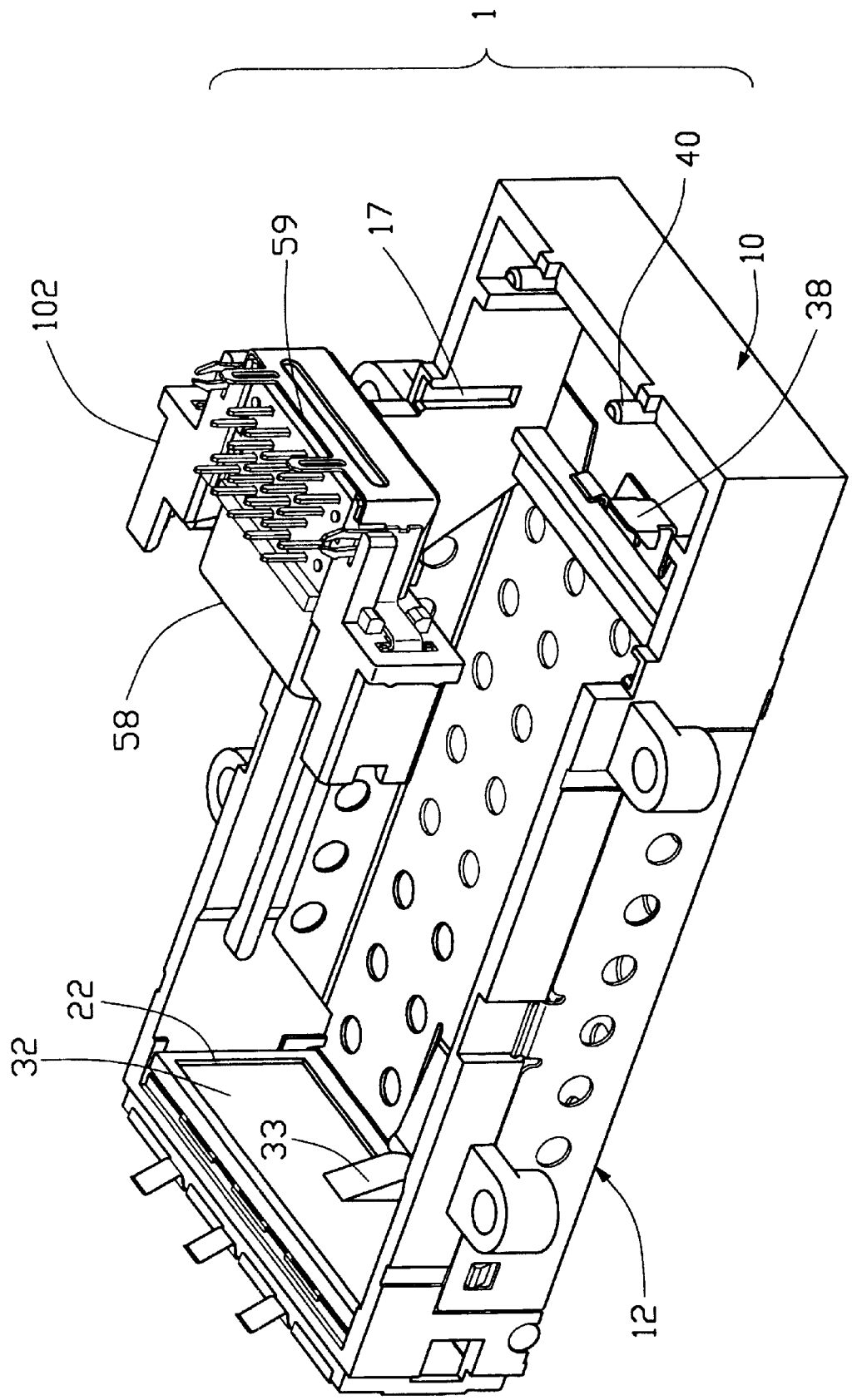
FIG. 2 is a bottom perspective view of a frame and a first connector of the guide rail shown in FIG. 1.
Figure 3:
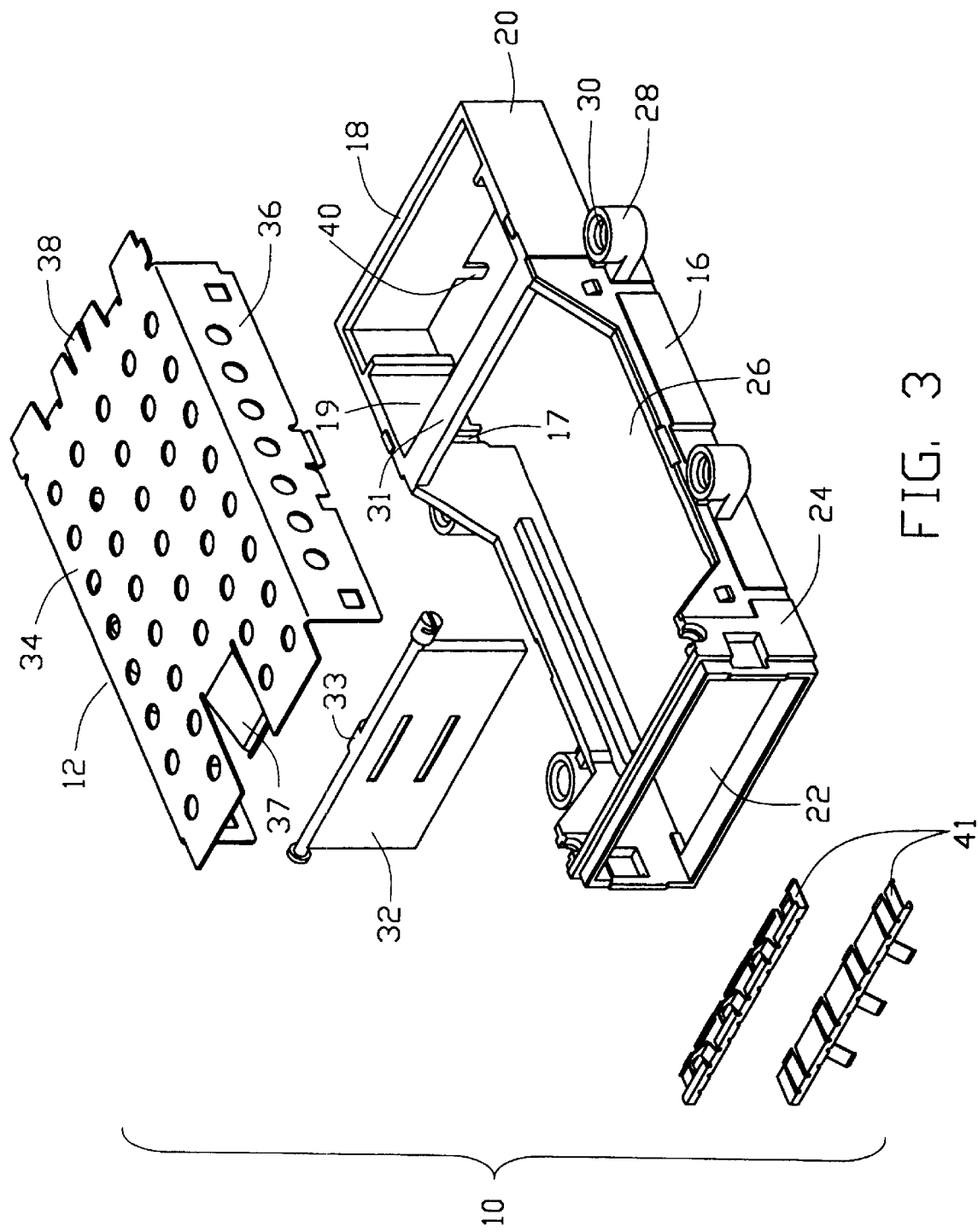
FIG. 3 is an enlarged, exploded, perspective view of the frame and the metallic cover shown in FIG. 2.

Referring to FIGS. 2 and 3 particularly, the frame 10 includes a pair of side beams 16, a rear wall 18 connecting rear ends 20 of the side beams 16, and a front portion 24. A port 22 is defined through the front portion 24 for entrance of the GBIC module. The frame defines a receiving space 26 between the side beams 16 and the rear wall 18 for receiving the GBIC module therein. Each side beam 16 defines a receiving slot 17 in an inner wall 19 thereof for retention of the connector assembly 14. The frame 10 also includes two pairs of side lugs 28 at opposite sides thereof, each defining a threaded hole 30 for passage of a fastener 78 therethrough to secure the frame to the supporting poles 15. A reinforced rib 31 is connected between the two side beams 16 of the frame 10 to strengthen the frame 10. The frame 10 further includes a door 32 pivotably attached to the front portion 24 thereof. The door 32 is closed relative to the port 22 before the entrance of the GBIC module and becomes open after the entrance of the GBIC module. The frame 10 provides a pair of posts 40 at a bottom thereof for pre-retention of the frame 10 onto the PCB 2 or onto a printed substrate 100. A pair of grounding plates 41 is attached to the front portion 24 of the frame 10 to assure adequate grounding between the guide rail 1 and an inserted GBIC module.

The metallic cover 12 includes a plate 34 and two side portions 36 bent 90 degrees from opposite edges of the plate 34 for attaching the metallic cover 12 to the frame 10. The metallic cover 12 provides an elastic arm 37 at an end thereof adjacent to the port 22 of the frame 10 for urging a portion 33 of the door 32 to a closed state relative to the port 22. The metallic cover 12 provides a hook 38 downwardly extending from an opposite end thereof for engaging with the connector assembly 14.

Figure 5:
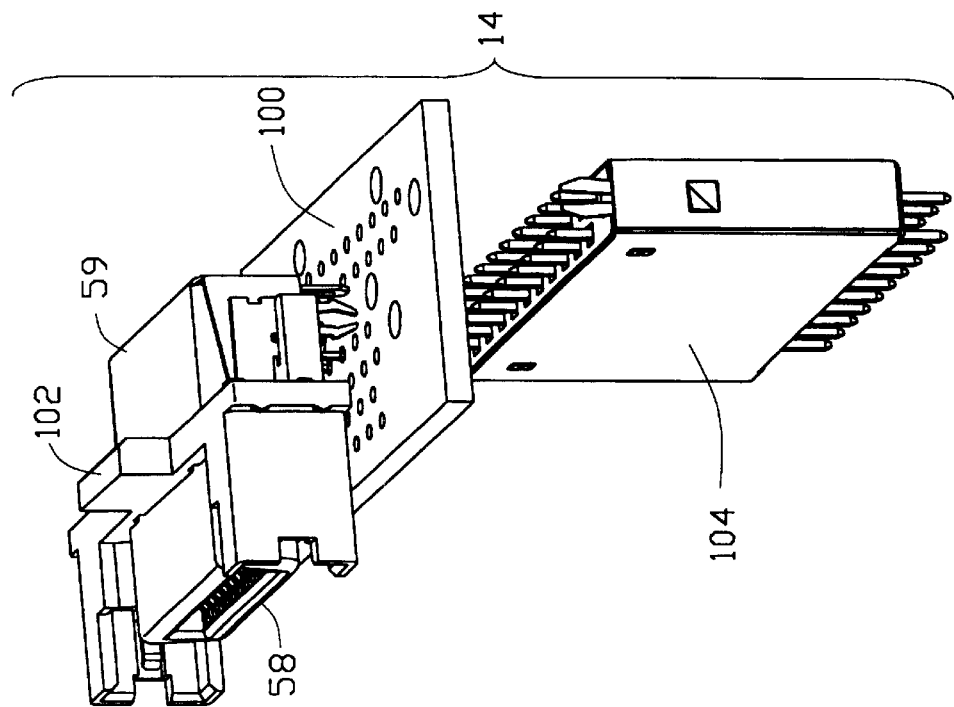
FIG. 5 is a view similar to FIG. 4, but taken from a front and right perspective.
Figure 4:
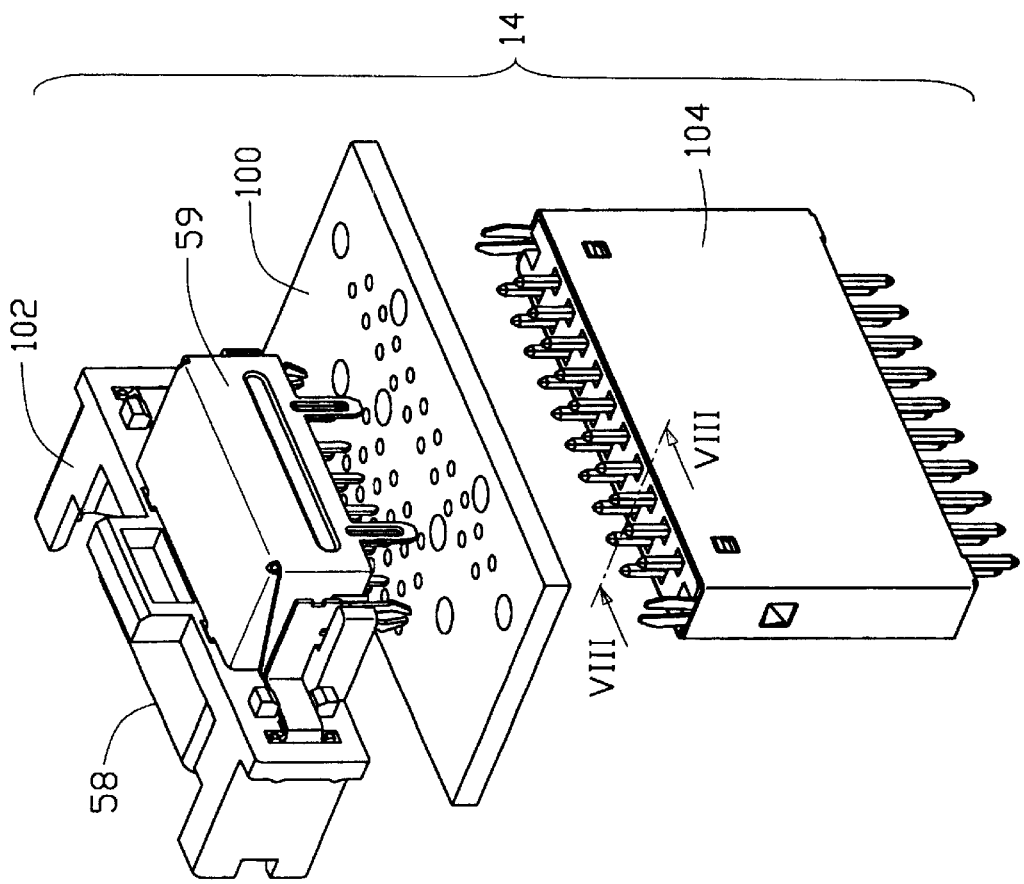
FIG. 4 is an enlarged, partially exploded, perspective view of the connector assembly shown in FIG. 1, taken from a rear and right perspective.
Figure 6:
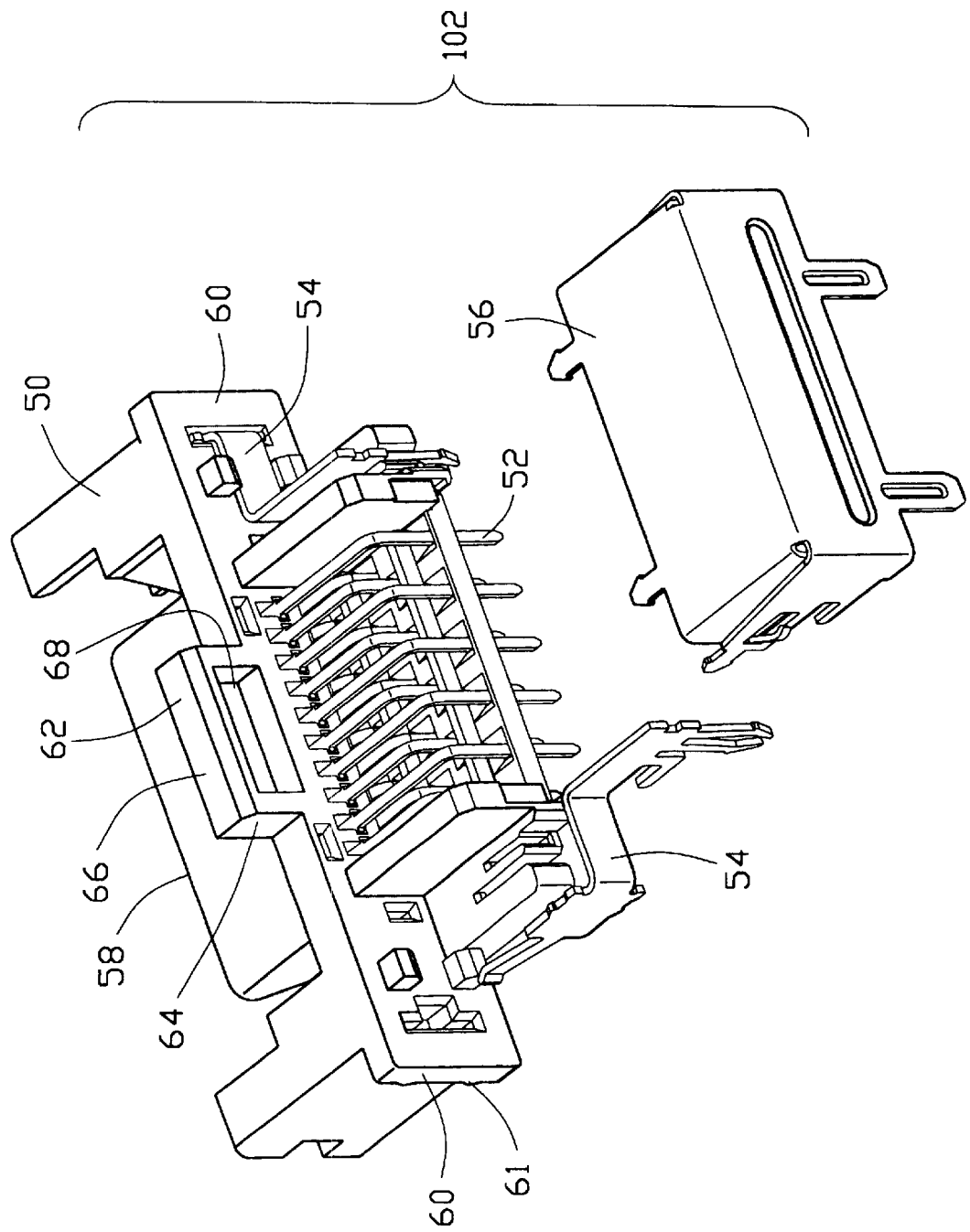
FIG. 6 is an enlarged, partially exploded, perspective view of the first connector shown in FIG. 4.

Referring particularly to FIGS. 4–6, the connector assembly 14 includes the printed substrate 100, a first connector 102 and a second connector 104 mounted onto top and bottom surfaces of the printed substrate 100. The first connector 102 includes an insulative housing 50 receiving a plurality of contacts 52 therein, a pair of grounding terminals 54 fixed to opposite side sections (not labeled) of the housing 50 and an EMI shell 56 attached to the housing 50 and enclosing a rear portion of the first connector 102. The first connector 102 has a mating portion 58 at a front portion thereof adapted for engaging with the GBIC module in the frame 10 and a mounting portion 59 at an opposite rear portion thereof for mounting onto the PCB 2 or the printed substrate 100. The housing 50 provides a pair of partitioning ribs 60 with teeth 61 thereon at the side sections thereof and an ear portion 62 at a top thereof. The ear portion 62 includes two upstands 64 and a blade 66 connected to the two upstands 64 and defines a recess 68 between the upstands 64 and the blade 66.

Figure 7:
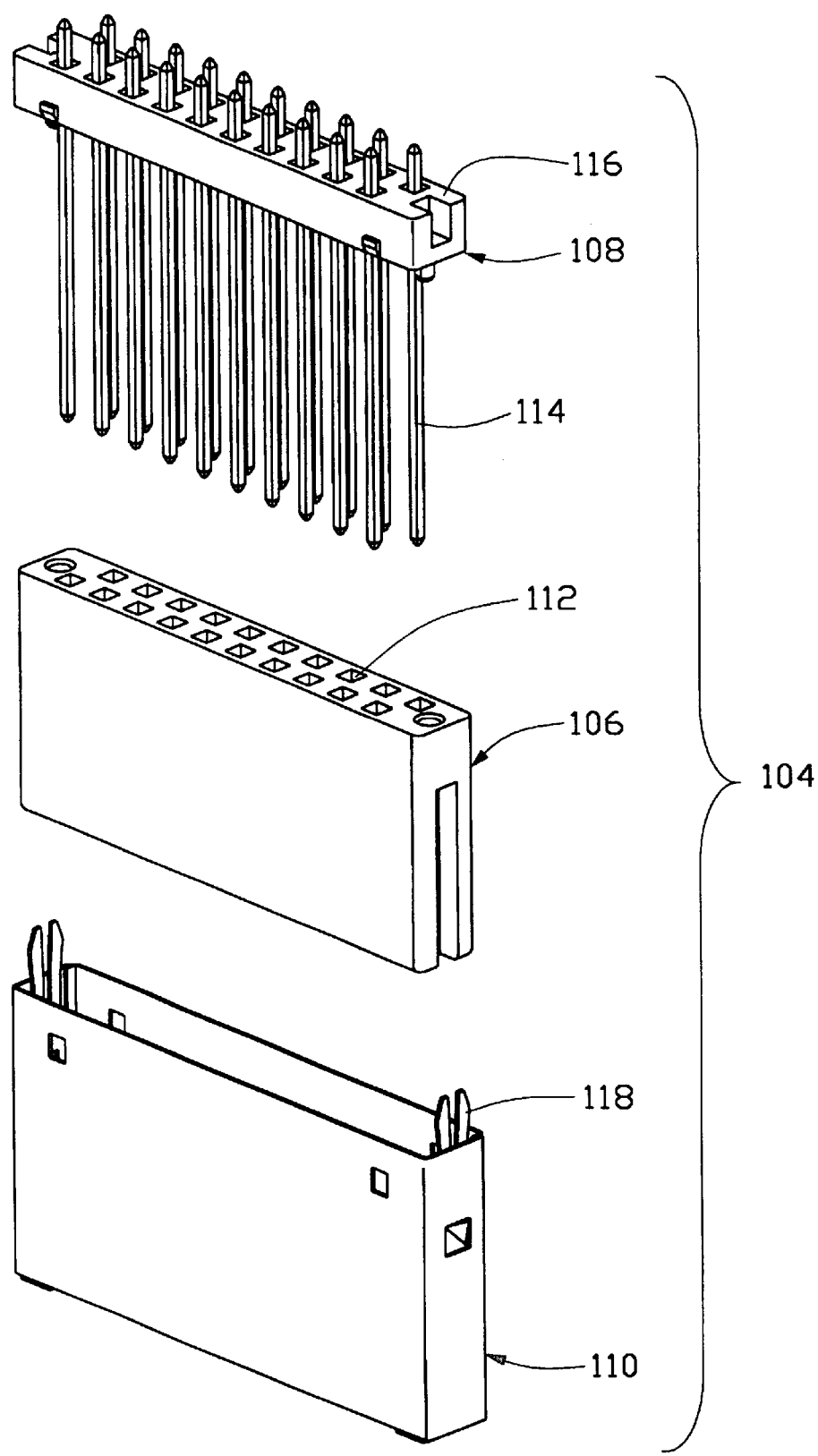
FIG. 7 is an enlarged, partially exploded, perspective view of a second connector shown in FIG. 4.
Figure 8:
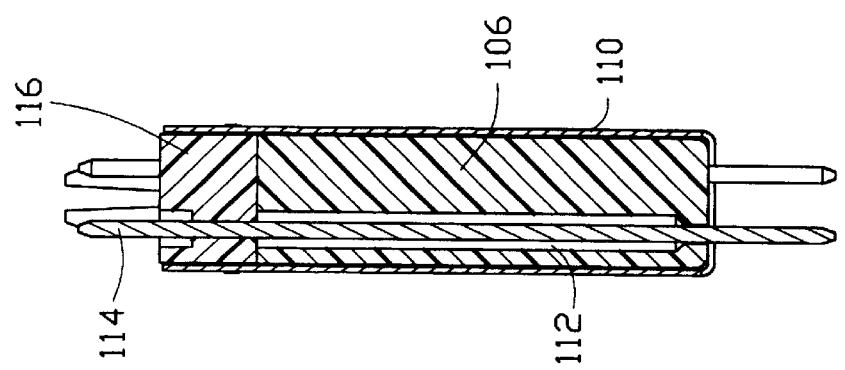
FIG. 8 is a cross-sectional view of the second connector taken along line VIII—VIII of FIG. 4.

Referring particularly to FIGS. 7 and 8, the second connector 104 includes an insulative extension 106, a terminal module 108 assembled to the insulative extension 106 and a metallic shield 110 enclosing the insulative extension 106 and the terminal module 108 to provide EMI shielding to the second connector 104. The insulative extension 106 defines a plurality of cavities 112 therethrough. The terminal module 108 includes a plurality of terminals 114 arranged in rows, held by an insulative base 116. The metallic shield 110 provides a pair of board-locks 118 at opposite sides thereof which are mountable onto the printed substrate 100 in an upside-down fashion to provide a grounding trace for the metallic shield 110. The cavities 112 each receive a respective terminal 114 therein and have a dimension larger than the transverse size of the respective terminal 114 to achieve a desired impedance of the terminals 114. Thus, a narrow air space (not labeled) exists between each terminal 114 and interior sidewalls (not labeled) of each corresponding cavity 112. Furthermore, each cavity 112 includes an outlet (not labeled) at a lower end thereof dimensioned such that the corresponding terminal 114 is snugly fitted therein (see FIG. 8).

When assembled in the completed connector assembly 14, the contacts 52 of the first connector 102 and the terminals 114 of the second connector 104 both electrically connect with printed circuit traces (not shown) in the printed substrate 100. In this way, the contacts 52 are electrically connected with the terminals 114. Furthermore, the grounding terminals 54 and the EMI shell 56 of the first connector 102, as well as the board locks 118 of the second connector 104 all electrically connect with grounding circuit traces in the printed substrate 100, assuring grounding continuity between the first and second connectors.

Figure 9:
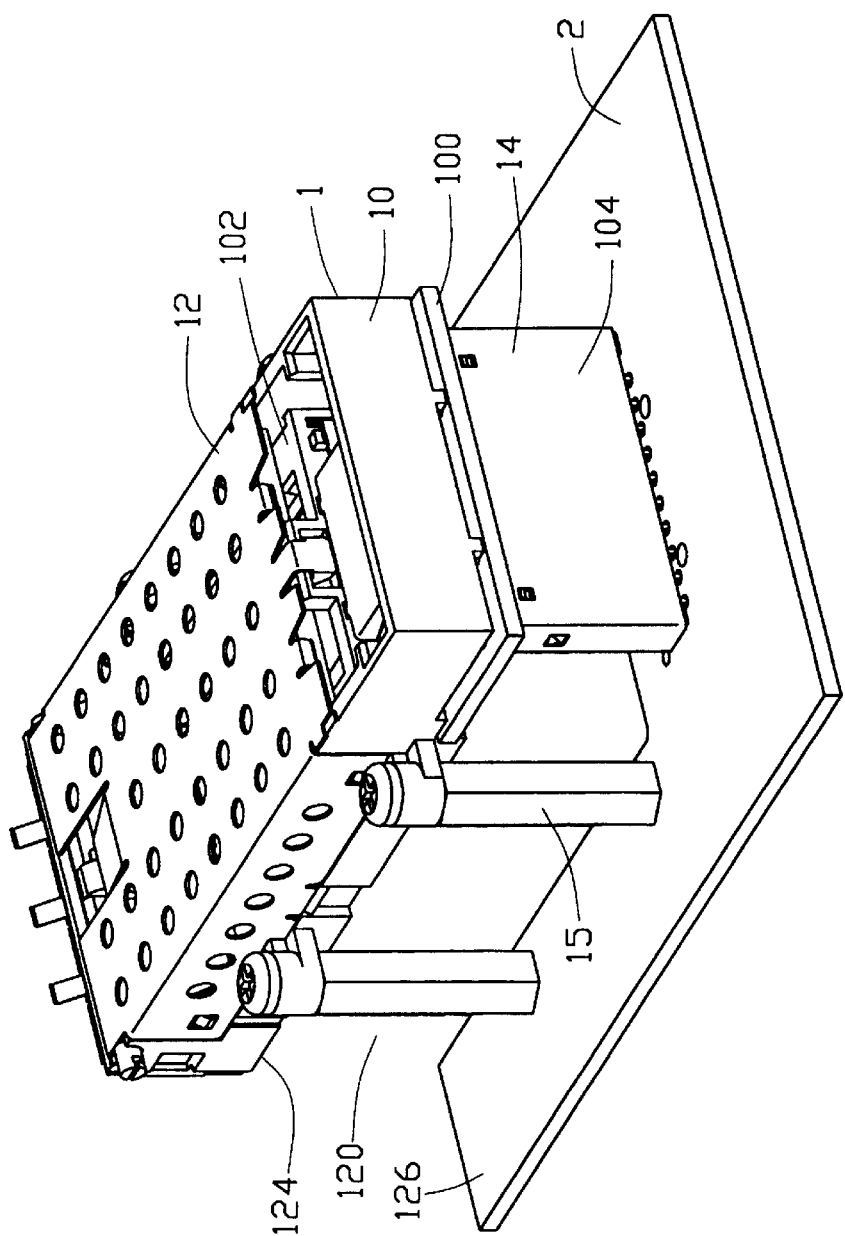
FIG. 9 is an assembled, perspective view of the guide rail of the present invention taken from a top-rear perspective.
Figure 10:
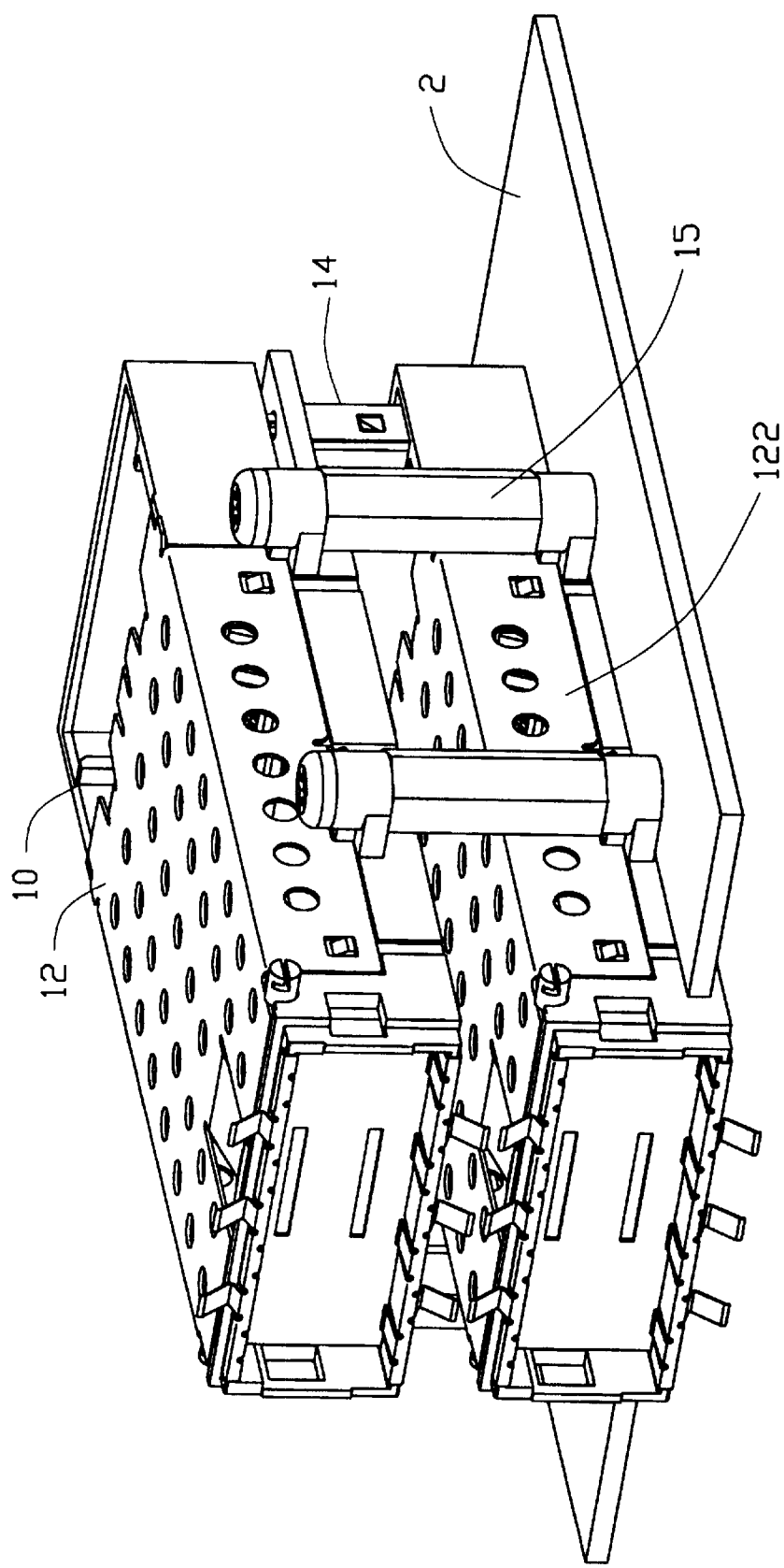
FIG. 10 is a perspective view of a stacked dual guide rails assembly.

Also referring to FIG. 9, in assembly, the metallic cover 12 is downwardly assembled to the frame 10 by the engagement of the side portions 36 thereof with the side beams 16. The elastic arm 37 elastically urges the door 32 to a closed state. The connector assembly 14 is upwardly assembled to the frame 10 by the engagement of the first connector 102 with the two side beams 16. The partitioning ribs 60 are fixedly received in the respective receiving slots 17 in the side beams 16 and the teeth 61 securely engage with peripheral walls of the receiving slots 17, thereby securely retaining the first connector 102 to the frame 10. The hook 38 of the metallic cover 12 hooks the ear portion 62 of the first connector 102 with keys 43 (See FIG. 1) thereof received in the recess 68. The four supporting poles 15 are attached to the corresponding side lugs 28 by the four fasteners 78, i.e. bolts, and to the PCB 2 via solders. The terminals 114 of the second connector 104 are electrically and mechanically connected to the PCB 2. The second connector 104 and the four supporting poles 15 elevate the frame 10 a predefined distance above the PCB 2 and a space 120 (labeled in FIG. 9) for receiving a second guide rail 122 (shown in FIG. 10) is defined between a bottom surface 124 of the first frame 10 and an upper surface 126 of the PCB 2.

Figure 11:
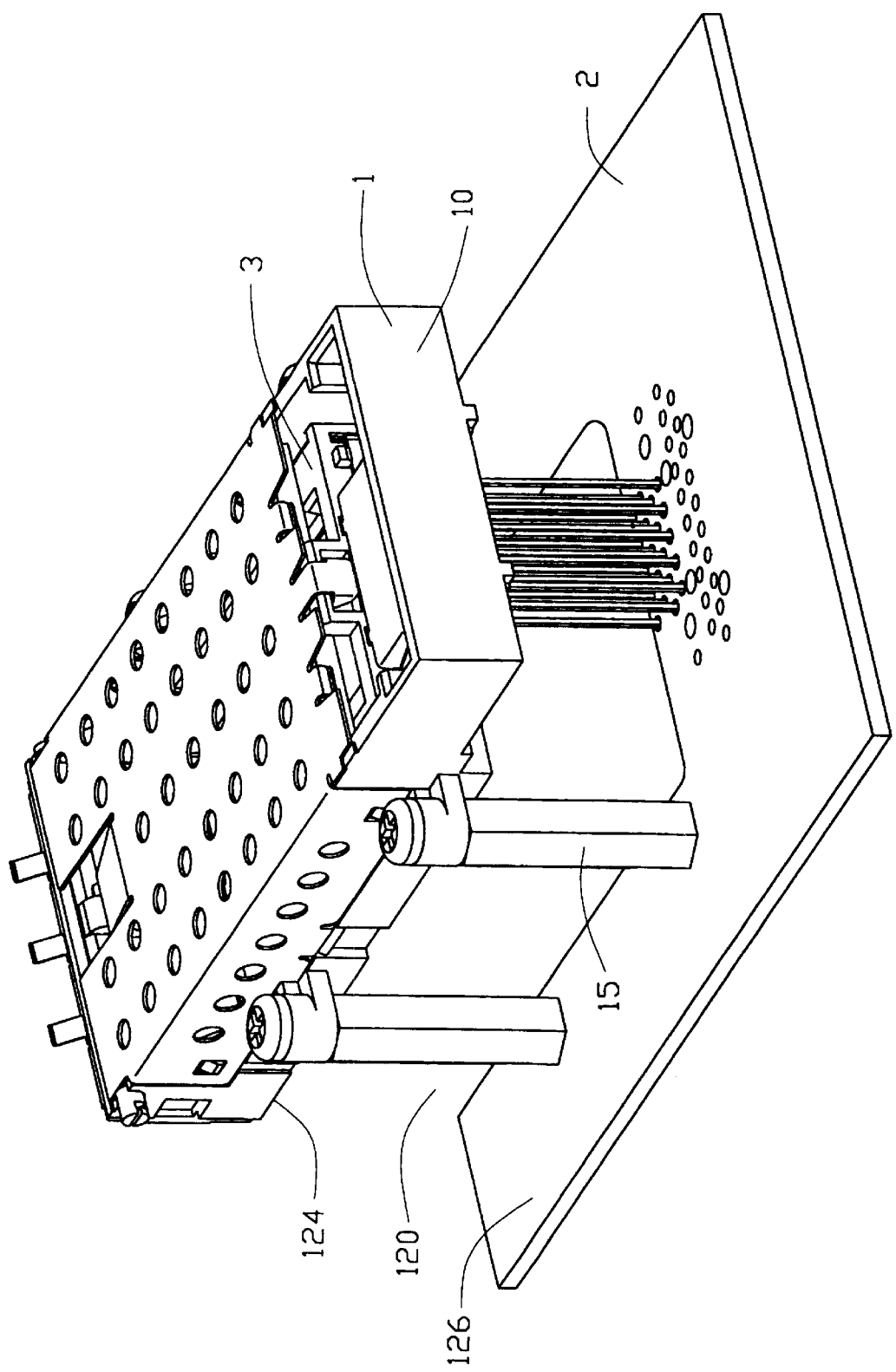
FIG. 11 is a perspective view of a second embodiment of the present invention.

As shown in FIG. 11, an alternative embodiment of the present invention is illustrated. The guide rail 1 includes a modified first connector 3 having contacts downwardly extending and directly mounting into the PCB 2.

Please note that, instead of having a separate metallic cover 12 covering the frame 10 to provide EMI protection, the frame itself might be metallic and integrally form the cover itself.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A guide rail system for receiving a GBIC module therein, comprising:

a printed circuit board; and a guide rail, comprising:

a frame defining a receiving space for receiving the GBIC module therein through a front port thereof;

a metallic cover attached to said frame for providing EMI shielding to said GBIC module; and a connector assembly engageably attached to said frame and connected to said circuit board and elevating the frame above the printed circuit board so as to receive a second guide rail under the frame, the connector assembly electrically connecting to the printed circuit board and being detachably electrically connectable to a GBIC module inserted into the frame.

2. The guide rail system as recited in claim 1, wherein the frame includes at lease two side lugs at opposite sides thereof supported by at least a pair of poles arranged between said side lugs and said printed circuit board.

3. The guide rail system as recited in claim 1, wherein said connector assembly includes a first connector securely received in a rear portion of said frame, a second connector electrically connected to said printed circuit board and a printed substrate electrically joining the first and the second connectors.

4. The guide rail system as recited in claim 3, wherein said second connector is enclosed by a metal shell.

5. The guide rail system as recited in claim 3, wherein said second connector includes a plurality of header pins supported by a base, an extension having a plurality of passageways and being attached to the base, and a metal shell securely attaching the base to the extension.

6. The guide rail system as recited in claim 5, wherein said passageways of said extension each are slightly larger than a cross section of the header pins so that, when assembled, a narrow air space exists between each header pin and interior walls of each corresponding said passageway.

7. The guide rail system as recited in claim 6, wherein said passageways each include an outlet dimensioned such that the header pin is snugly fitted therein.

8. The guide rail system as recited in claim 5, wherein said metal shell includes a pair of board locks electrically connected to the substrate.

9. A guide rail assembly adapted for enclosing a GBIC module therein comprising:
   a printed circuit board; and
   a guide rail comprising:
      a frame defining a receiving space for receiving a GBIC module therein and defining a port at a front portion thereof for entrance of the GBIC module;
      an electrical connector assembly engageably attached to the frame and electrically mounted onto the printed circuit board, the electrical connector assembly having a printed substrate and a first connector and a second connector respectively electrically mounted on upper and lower surfaces of the printed substrate; and
      a space defined under a bottom surface of the frame for receiving a second guide rail.

10. The guide rail assembly as claimed in claim 9, wherein the first connector electrically connects with the GBIC module and the second connector electrically connects with the printed circuit board.

11. The guide rail assembly as claimed in claim 10, wherein the frame has a conductive outer surface for providing EMI shielding to the GBIC module.

12. The guide rail assembly as claimed in claim 9, wherein the connector assembly is securely attached to the frame prior to being mounted onto the printed circuit board.

13. The guide rail assembly as claimed in claim 9, further including a pair of poles supporting the frame above the printed circuit board, thereby defining the space under the frame for receiving the second guide rail.

14. A guide rail assembly for receiving a GBIC module therein comprising:
   a printed circuit board; and
   a guide rail, comprising:
      a frame defining a receiving space and having a port through a front portion thereof for receiving a GBIC module therein through the front portion thereof, the frame providing side lugs at outer walls thereof; and
      supporting poles attached to the respective side lugs of the frame so as to elevate the frame above the printed circuit board a predetermined height adapted for receiving a second guide rail under the frame.

15. The guide rail assembly as claimed in claim 14, further including an electrical connector assembly engageably attached to the frame, the connector assembly having an extension extending downwardly beyond a bottom surface of the frame and electrically mounting to the printed circuit board.

16. The guide rail assembly as claimed in claim 15, wherein the electrical connector assembly includes a printed substrate on which the extension mounts, and a first connector mounting to the printed substrate for electrically connecting with a GBIC module mounted in the frame.

17. The guide rail assembly as claimed in claim 14, further including an electrical connector engageably attached to the frame, the connector having contacts downwardly extending and mounted onto the printed circuit board.

18. The guide rail assembly as claimed in claim 17, wherein the connector has partitioning ribs on opposite sides thereof engageably received in receiving slots defined in inner walls of side beams of the frame.

19. An guide rail system for receiving two electronic modules therein, comprising:
   a printed circuit board;
   first and second guide rails stacked with each other and commonly mounted upon the printed circuit board;
   said first guide rail including a first frame with a first built-in connector assembly therein; and
   said second guide rail including a second frame with a second built-in connector assembly therein; wherein
   said first frame is substantially identical to said second frame while the first connector assembly is substantially different from the second connector assembly.

20. The system as recited in claim 19, wherein the second guide rail is positioned between said first guide rail and the printed circuit board, and a portion of said first connector assembly extends vertically through said second frame toward the printed circuit board while without interference against the second connector assembly.

* * * * *